(12) United States Patent
Meyers et al.

(10) Patent No.: US 9,821,730 B1
(45) Date of Patent: Nov. 21, 2017

(54) MOTOR VEHICLE ROOF DITCH COVER CLIP

(71) Applicant: Newfrey LLC, New Britain, CT (US)

(72) Inventors: Jason A. Meyers, Shelby Township, MI (US); Tien T. Diep, West Bloomfield, MI (US)

(73) Assignee: Newfrey LLC, New Britain, CT (US)

( * ) Notice: Subject to any disclaimer, the term of this patent is extended or adjusted under 35 U.S.C. 154(b) by 0 days.

(21) Appl. No.: 15/158,784

(22) Filed: May 19, 2016

(51) Int. Cl.
*B62C 99/00* (2009.01)
*B60R 13/02* (2006.01)

(52) U.S. Cl.
CPC ................. *B60R 13/0212* (2013.01)

(58) Field of Classification Search
CPC .................................................. B60R 13/0212
See application file for complete search history.

(56) References Cited

U.S. PATENT DOCUMENTS

| | | | |
|---|---|---|---|
| 2,948,368 A | 8/1960 | Arnold | |
| 3,897,967 A | 8/1975 | Barenyi | |
| 4,698,882 A | 10/1987 | Lang | |
| 5,013,083 A | 5/1991 | Yada et al. | |
| 5,353,571 A | 10/1994 | Berdan et al. | |
| 6,102,473 A | 8/2000 | Steininger et al. | |
| 7,029,060 B1 * | 4/2006 | Osterberg | B60R 13/04 296/203.03 |
| 7,165,807 B2 | 1/2007 | Wato et al. | |
| 7,695,038 B2 | 4/2010 | Harberts et al. | |
| 7,837,257 B2 | 11/2010 | Kuntze et al. | |
| 8,205,923 B2 | 6/2012 | Mourou | |
| 8,657,370 B1 * | 2/2014 | Pierce | B60R 13/06 296/210 |
| 8,677,572 B2 | 3/2014 | Scroggie et al. | |
| 9,168,878 B2 | 10/2015 | Bozinovski | |
| 2002/0037389 A1 | 3/2002 | Miyano et al. | |
| 2010/0180536 A1 | 7/2010 | Reznar | |
| 2012/0068488 A1 * | 3/2012 | Mourou | B60R 13/0206 296/1.08 |

(Continued)

FOREIGN PATENT DOCUMENTS

| | | | | |
|---|---|---|---|---|
| JP | 03-028042 A | 2/1991 | | |
| JP | 10-086765 A | 4/1998 | | |
| WO | WO-2012097298 A1 * | 7/2012 | ......... | B60R 13/0206 |

*Primary Examiner* — Lori L Lyjak
(74) *Attorney, Agent, or Firm* — Harness, Dickey & Pierce, PLC

(57) ABSTRACT

The ditch molding clip can include a single piece body. The single piece body can include (1) an outer frame surrounding an interior opening, (2) a clip-to-molding retention coupling including a plurality of resilient arm members extending from the outer frame and designed to engage and retain a corresponding edge of the molding, (3) a clip-to-weld-stud retention coupling positioned within the interior opening and including an aperture designed to receive and retain the weld stud, and (4) an extensible member extending between the outer frame and the clip-to-molding retention coupling. A longitudinal length of the extensible member can be designed to lengthen to allow the clip-to-weld stud retention coupling to move within the interior opening to accommodate for variations in the positioning of the weld stud relative to the ditch. The extensible member can have a corrugated configuration.

20 Claims, 5 Drawing Sheets

(56) References Cited

U.S. PATENT DOCUMENTS

2014/0131406 A1\* 5/2014 Jutila .................. B60R 9/058
 224/321
2014/0201957 A1 7/2014 Scroggie et al.

\* cited by examiner

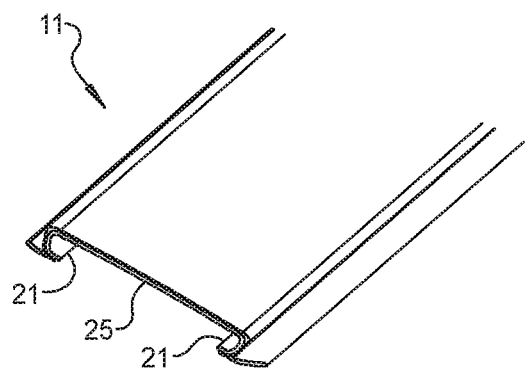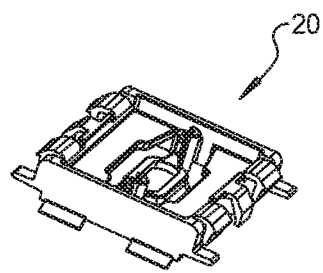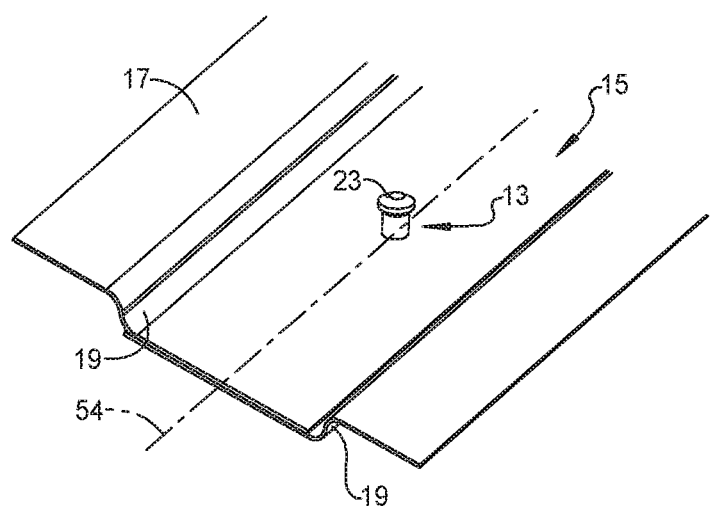
FIG 1

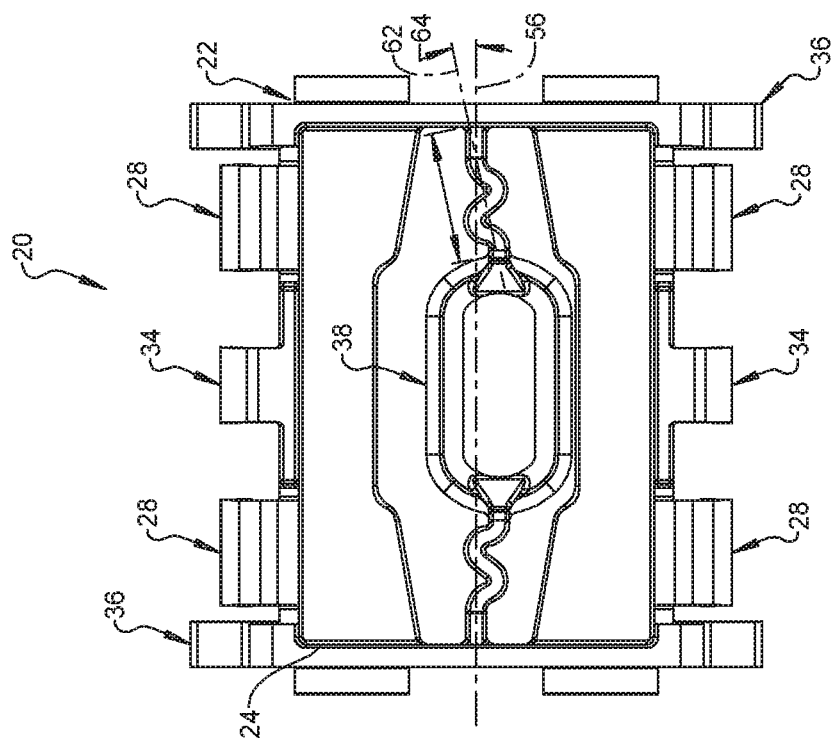
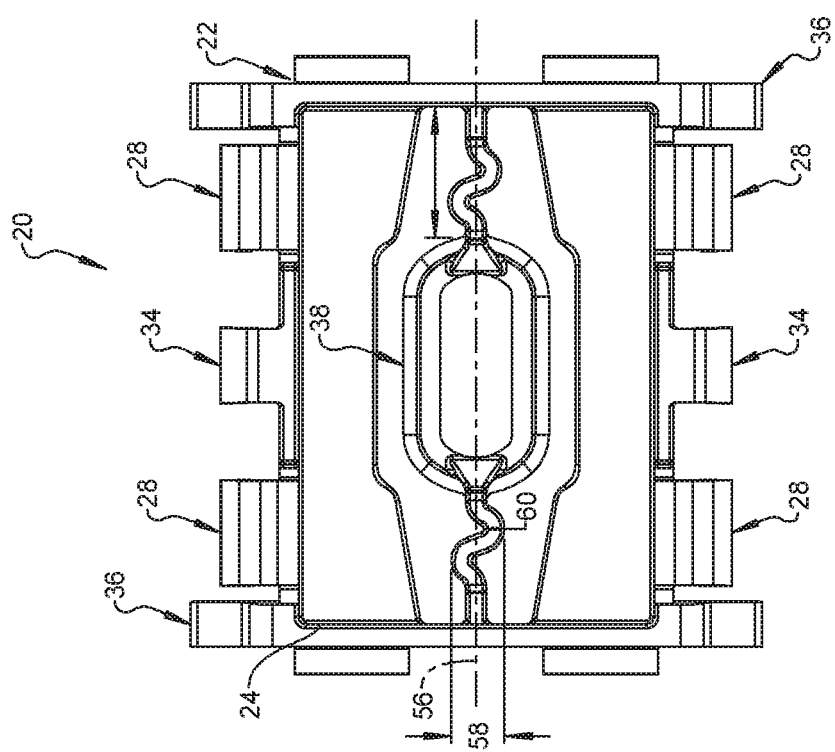

MOTOR VEHICLE ROOF DITCH COVER CLIP

FIELD

The present disclosure relates to clips for coupling a molding to a ditch in the surface of a motor vehicle, and more particularly to clips for coupling a cover over a roof ditch of an automobile.

BACKGROUND

This section provides background information related to the present disclosure which is not necessarily prior art.

It is common to use ditch moldings on motor vehicles. Ditch moldings may be applied in relation to surface ditches to cover joints, seams and other unappealing features, or they may be applied in relation to surface ditches simply for aesthetic purposes. Because it is not always easy to attach molding directly to automobile body parts, molding is often attached using a specialized retainer clip.

A variety of automobiles now include a roof ditch that extends along a portion of the roof above the doors. The roof ditch is typically defined by the joint between the roof and the side panel of the automobile. Typically, the roof ditch is covered at least in part by a roof ditch molding or cover. Such molding typically has an interior support of metal or the like with a generally "C" shaped section profile. The interior support can be covered with a more pliable material such as rubber or the like which extends outwardly to engage sides of the roof ditch.

In many applications, retaining clips couple the roof ditch cover to corresponding weld studs positioned along the roof ditch. In some instances, the lateral position of the various weld studs relative to the side or sides of the ditch can vary along the roof ditch. Since the clip operates by coupling to both the ditch cover and the stud, such variation in the lateral positioning of the weld studs can cause the cover to engage the side of the roof ditch, which can prevent the retaining clip from being able to operatively couple with both the cover and weld stud. Even if coupling is not prevented, the overlying molding will tend to be out of position, which can result in functional or aesthetic deficiencies of the ditch cover. Accordingly, a continuing need exists for a roof ditch molding retainer which accommodates lateral variations in the positioning of the weld studs along the length of the ditch molding.

SUMMARY

This section provides a general summary of the disclosure, and is not a comprehensive disclosure of its full scope or all of its features.

In accordance with one aspect of the present disclosure, a ditch molding clip for coupling a molding to a weld stud of a ditch of a motor vehicle surface is provided. The ditch molding clip can include a single piece body. The single piece body can include (1) an outer frame surrounding an interior opening, (2) a clip-to-molding retention coupling including a plurality of resilient arm members extending from the outer frame and designed to engage and retain a corresponding edge of the molding, (3) a clip-to-weld-stud retention coupling positioned within the interior opening and including an aperture designed to receive and retain the weld stud, and (4) an extensible member extending between the outer frame and the clip-to-molding retention coupling. A longitudinal length of the extensible member can be designed to lengthen to allow the clip-to-weld stud retention coupling to move within the interior opening to accommodate for variations in the positioning of the weld stud relative to the ditch.

In accordance with one aspect of the present disclosure, a ditch cover clip for coupling a ditch cover to a weld stud of a ditch of a motor vehicle surface is provided. The ditch cover clip can include a single piece molded polymeric body. The single piece molded polymeric body can include (1) an outer frame surrounding an interior opening, (2) a clip-to-cover retention coupling including a plurality of resilient arm members extending from the outer frame and designed to engage and retain a corresponding edge of the cover, (3) a clip-to-weld-stud retention coupling positioned within the interior opening and including an aperture designed to receive and retain the weld stud, and (4) a pair of extensible members extending between the outer frame and the clip-to-cover retention coupling. The extensible member can have a corrugated configuration.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is an exploded partial perspective view of an exemplary assembly including one example of a motor vehicle roof ditch clip in accordance with the present disclosure.

FIG. 4 is a top plan view of the exemplary clip of the assembly of FIG. 1.

FIG. 5 is a top plan view similar to FIG. 4, but with the extensible members of the example clip in an extended position.

Corresponding reference numerals indicate corresponding parts throughout the several views of the drawings.

DETAILED DESCRIPTION

Example embodiments will now be described more fully with reference to the accompanying drawings.

Figure 2:
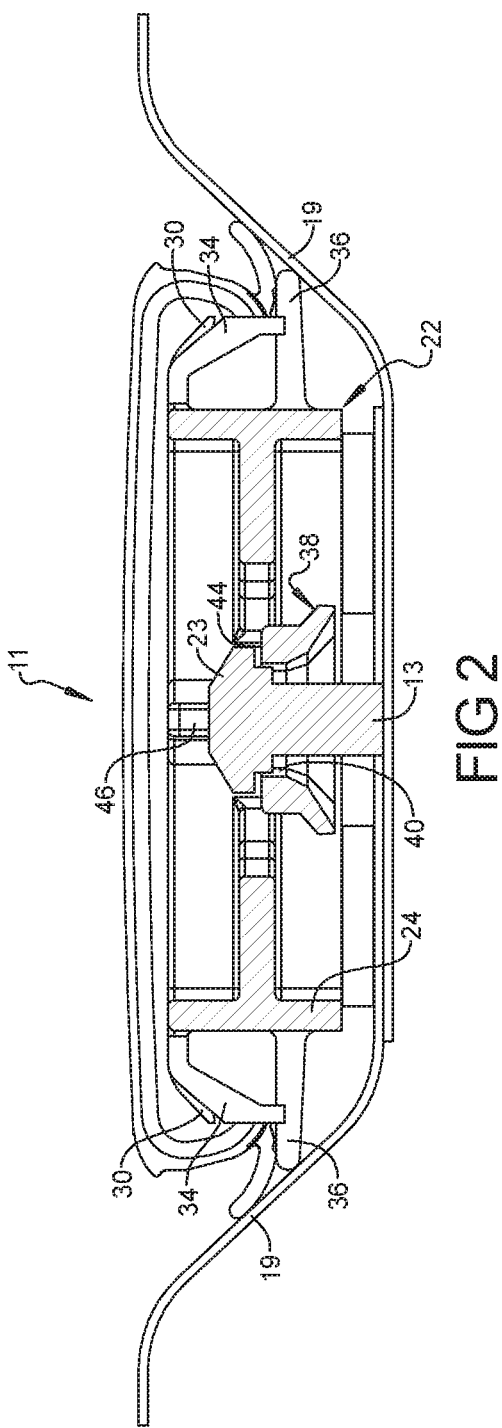
FIG. 2 is a cross sectional view of the exemplary assembly of FIG. 1.
Figure 3:
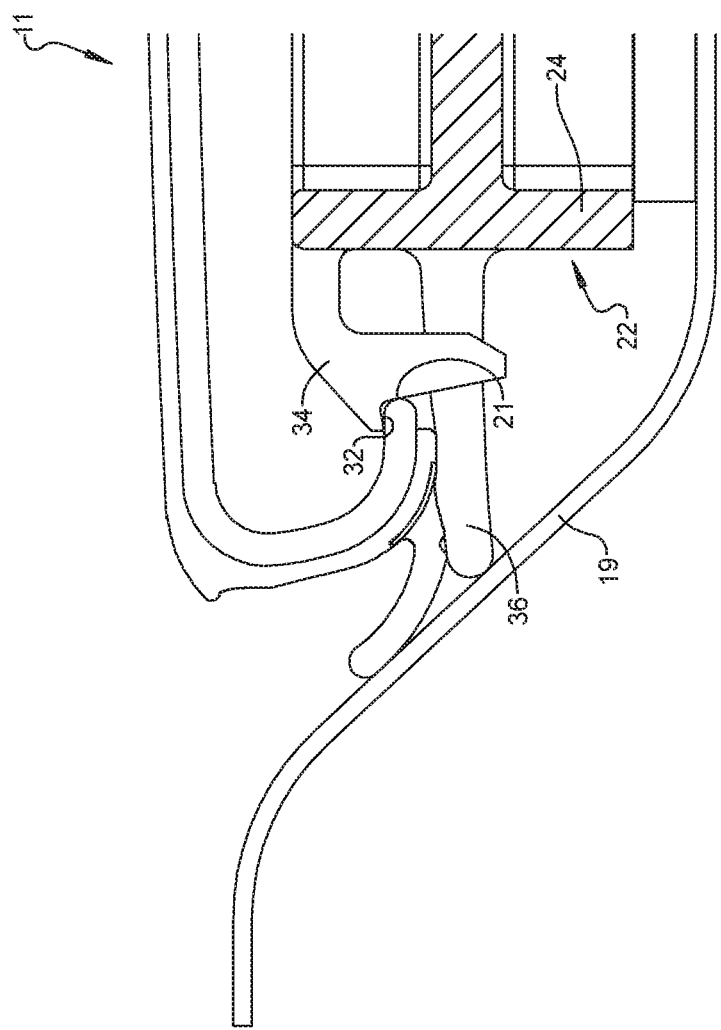
FIG. 3 is a partial cross-sectional view of the exemplary assembly of FIG. 1.
Figure 6:
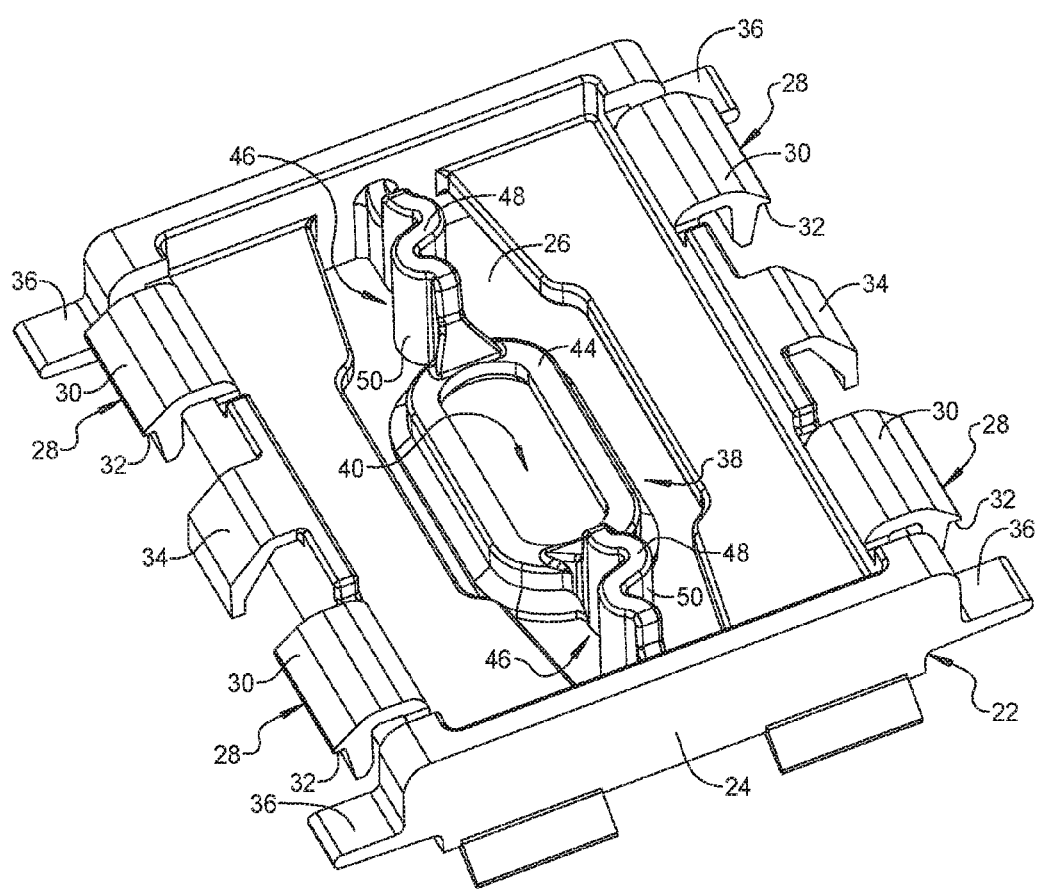
FIG. 6 is a perspective view of the example clip of the assembly of FIG. 1.

FIGS. 1-6 illustrate one example embodiment of a clip 20 in accordance with the present disclosure. The ditch molding or cover clip 20 is designed to couple a ditch molding or cover 11 to a weld stud 13 of a ditch 15 of a motor vehicle surface 17. The ditch 15 can include a pair of longitudinally extending side surfaces or side walls 19. Alternatively, the clip can be designed to couple a molding to the weld stud 13 of a ditch 15 of a motor vehicle surface 17 having a single side wall 19.

The ditch cover clip 20 can be a single-piece body 22 and can be a molded polymeric body. The body 22 can include an outer frame 24 surrounding an interior opening 26. A clip-to-molding or clip-to-cover retention coupling 28 can include a plurality of resilient arm members 30 extending laterally outwardly from the outer frame 24. The resilient arm members 30 can include coupling lips or detents 32 so that each resilient arm 30, including the coupling detent 32, is designed to engage and retain a corresponding edge 21 of the cover 11.

Outwardly extending stop members 36 can be provided to sandwich the corresponding edge between the detent 32 and the stops 36. Resilient arm members 34 can also be provided to engage a notch (not shown) in the edge 21 to prevent longitudinal movement of the clip 20 along the length of the cover 11. Alternatively, the resilient arm members 30 themselves can engage the edge 21 at such a notch.

A clip-to-weld-stud retention coupling 38 can be positioned within the interior opening 26. The clip-to-weld-stud retention coupling 38 can include an aperture 40 designed to receive and retain a head 23 of the weld stud 13. For example, the clip-to-weld-stud retention coupling 38 can include an angled entry surface 42 and an oppositely disposed retention surface 44. The aperture 40 can have an elongated oval shape to accommodate variations in the positioning of the weld stud 13. As in the illustrated example, the aperture 40 can be elongated in a direction that is aligned with the longitudinal direction of the ditch 15. Thus, the elongated oval aperture 40 can accommodate variations in the longitudinal positioning of the weld stud 13 relative to the ditch 15. Alternatively, the aperture 40 can be elongated in a direction that is transverse to the longitudinal direction of the ditch 15 to accommodate variations in the lateral positioning of the weld stud 15 relative to the ditch 15.

A pair of extensible members 46 can extend between the outer frame 24 and the clip-to-molding retention coupling 38. The extensible members 46 are designed to lengthen longitudinally to allow the clip-to-weld stud retention coupling 38 to move within the interior opening 26 to accommodate for variations in the positioning of the weld stud 13 relative to the ditch 15. In the illustrated example, the extensible members 46 have a corrugated configuration in which corrugations of the corrugated wall extend in a side-to-side direction that is transverse to the longitudinal direction of the extensible members. In other words, the sinusoidal end wall provides an upper or top surface 48 of the corrugated wall 50 faces toward the top of the clip 22.

As in the illustrated embodiment, the corrugated extensible members 46 can have non-extended position extending, or can be molded to, or can initially, extend in a direction in which the longitudinal lengthening of the extensible members 46 accommodates variations in the lateral positioning of the weld stud 13 relative to the ditch 15. Alternatively, the corrugated extensible members 46 can have a non-extended or initial position extending in a direction in which longitudinal lengthening of the extensible members 46 accommodates variations in the longitudinal positioning of the weld stud 13 relative to the ditch 15.

As in the illustrated example, in the non-extended or initial position of the extensible members 46, the extensible members 46 can longitudinally extend in a direction that is in alignment with the direction in which the aperture 40 is elongated. In addition, this aligned direction that the extensible members 46 initially extend in, and that the aperture 40 is elongated in, can also be aligned with the longitudinal direction 54 of the ditch 15 and of the cover 11. Alternatively, this aligned direction that the extensible members 46 initially extend in, and that the aperture 40 is elongated in, can be aligned transverse to the longitudinal direction of the ditch 15.

The corrugated extensible members 46 can be designed to resist movement other than longitudinal lengthening thereof. For example, the extensible members 46 can be designed to resist torsional rotation about the longitudinal length 56 of the extensible member 46, of to resist rotation along the longitudinal length of the extensible members that would result in movement in a height direction, or both. As in the illustrated example, this can be accomplished in whole or in part, by the extensible member 46 having a height in a top-to-bottom direction (as oriented in FIG. 2) of the extensible member 46 that is substantially the same as the overall height of the outer frame 24.

This can also be accomplished in whole or in part, via the upper or top surface 48 of each extensible member 46. As in the illustrated example, the top surface 48 of each extensible member 46 is positioned adjacent an interior surface 25 of the ditch molding or cover 11 such that the top surface 48 of the extensible member 46 contact against the interior surface 25 of the ditch cover 11. This can also be accomplished in whole or in part, via the top surface 48 having an overall contact area width 58, due to its sinusoidal shape as a result of the corrugated configuration of the extensible member 46, that is greater than the largest transverse width 60 of the wall or member 50 per se that forms or is the extensible member 46. The transverse width 60 of the wall 50 per se can vary along its length in order to facilitate flexing and extension and contraction of the extensible member 46.

Use of the example clip illustrated herein can include coupling a plurality of the clips 20 to the ditch cover 11 at various positions along the longitudinal length thereof that correspond to various positions along the longitudinal length of the ditch 15 at which corresponding weld studs 13 have been attached. The clip-to-cover retention couplings 28 of each clip 20 engage and retain the opposing edges 21 of the cover 11 as described above. The resilient arm members 34 can facilitate correct longitudinal positioning of the clips 20 via engagement with notches in the edges 21 as described above.

This cover 11 and multi-clip 20 sub-assembly can then be positioned over the ditch 15 and pressed down to engage the clip-to-weld-stud coupling 38 of each clip against the head 23 of a corresponding weld stud 13. The elongated oval shape of the stud retaining aperture 40 can accommodate for variations in the longitudinal positioning of a weld stud 13 in the ditch 15.

Variations in the lateral positioning of a weld stud 13 in the ditch 15 can be accommodated for by the corrugated extensible members 46. For example, as the head 23 of a slightly laterally offset weld stud 13 engages the entry surface of the stud retaining aperture 40 and enters the aperture 40, the weld stud 13 becomes laterally centered within the aperture 40. To the extent the cover 11 and clip 20 are unable to move laterally to accommodate the lateral offset, a tensile force is exerted along the corrugated extensible members 46 causing them to elongate or increase their longitudinal length.

In some cases, the cover 11 and clip 20 is unable to move laterally as a result of lateral positioning forces imposed by clips 20 that have been previously coupled to weld studs 13 along the length of the cover 11. In some cases, the cover 11 and clip 20 is unable to move laterally as a result of lateral positioning forces imposed by the cover 11 engaging against an adjacent side edge or wall 19 of the ditch 15. In some cases, a combination of both these lateral positioning forces can be at play.

In the illustrated example, the initial, non-extended position (FIG. 4), the corrugated extensible members 46 extend longitudinally in an initial, non-extended direction 56 that is in alignment with the longitudinal direction 54 of the cover 11, the ditch 15, or both. In the extended position (FIG. 5), the corrugated extensible members 46 extend longitudinally in an extended direction 62 at an angle 64 to the non-extended direction 56 and to the longitudinal direction 54 of the cover 11 or ditch 15.

Spatially relative terms, such as "top," "bottom," "upper," "lower," "height," "length," "width," and the like, are used herein for ease of description to describe one element or feature's relationship to another element(s) or feature(s) as illustrated in the figures. Such spatially relative terms, however, are not intended to require a specific orientation of the device in use or operation, and other orientations are possible with the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A ditch molding clip for coupling a molding to a weld stud of a ditch of a motor vehicle surface, the ditch molding clip comprising:
   a single piece body comprising:
      an outer frame surrounding an interior opening
      a clip-to-molding retention coupling including a plurality of resilient arm members extending from the outer frame and designed to engage and retain a corresponding edge of the molding;
      a clip-to-weld-stud retention coupling positioned within the interior opening and including an aperture designed to receive and retain the weld stud;
      an extensible member extending between the outer frame and the clip-to-molding retention coupling;
      wherein a longitudinal length of the extensible member is designed to lengthen to allow the clip-to-weld stud retention coupling to move within the interior opening to accommodate for variations in the positioning of the weld stud relative to the ditch.

2. The ditch molding clip of claim 1, wherein the aperture has an elongated shape, and wherein the elongated shape is designed to accommodate for longitudinal variations in a position of the weld stud.

3. The ditch molding clip of claim 1, wherein the extensible member is designed to lengthen to allow the clip-to-weld stud retention coupling to move laterally within the interior opening to accommodate for lateral variations in a position of the weld stud.

4. The ditch molding clip of claim 1, wherein the aperture has an elongated shape that is elongated longitudinally, and wherein the extensible member has an initial longitudinally extending orientation.

5. The ditch molding clip of claim 1, wherein the extensible member has a height in a top-to-bottom direction that is designed to resist torsional rotation about the longitudinal length of the extensible member.

6. The ditch molding clip of claim 1, wherein the extensible member has a height in a top-to-bottom direction that is designed to resist movement of the clip-to-weld stud retention coupling in an upward direction transverse to the longitudinal length of the extensible member.

7. The ditch molding clip of claim 1, wherein of the extensible member has an upper surface that is positioned to contact an adjacent surface of the molding during coupling with the weld stud.

8. The ditch molding clip of claim 7, wherein the upper surface defines an overall contact area width that is greater than a transverse wall width of the extensible member.

9. The ditch molding clip of claim 1, wherein a pair of the extensible members is provided.

10. The ditch molding clip of claim 1, wherein the single piece body comprises a molded polymeric body.

11. A ditch cover clip for coupling a ditch cover to a weld stud of a ditch of a motor vehicle surface, the ditch cover clip comprising:
    a single piece molded polymeric body comprising:
       an outer frame surrounding an interior opening
       a clip-to-cover retention coupling including a plurality of resilient arm members extending from the outer frame and designed to engage and retain a corresponding edge of the cover;
       a clip-to-weld-stud retention coupling positioned within the interior opening and including an aperture designed to receive and retain the weld stud;
       a pair of extensible members extending between the outer frame and the clip-to-cover retention coupling;
       wherein the extensible member has a corrugated configuration.

12. The ditch molding clip of claim 11, wherein the aperture has an elongated shape, and wherein the elongated shape is designed to accommodate for longitudinal variations in a position of the weld stud, and wherein the extensible member is designed to lengthen to allow the clip-to-weld stud retention coupling to move laterally within the interior opening to accommodate for lateral variations in a position of the weld stud.

13. The ditch molding clip of claim 11, wherein the aperture has an elongated shape that is elongated longitudinally, and wherein the extensible member has an initial longitudinally extending orientation.

14. The ditch molding clip of claim 11, wherein the extensible member has a height in a top-to-bottom direction that is designed to resist torsional rotation about the longitudinal length of the extensible member.

15. The ditch molding clip of claim 11, wherein the extensible member has a height in a top-to-bottom direction that is designed to resist movement of the clip-to-weld stud retention coupling in an upward direction transverse to the longitudinal length of the extensible member.

16. The ditch molding clip of claim 11, wherein the extensible member has a height in a top-to-bottom direction that is substantially the same as an overall height of the outer frame.

17. The ditch molding clip of claim 11, wherein of the extensible member has an upper surface that is positioned to contact an adjacent surface of the cover during coupling with the weld stud.

18. The ditch molding clip of claim 17, wherein the upper surface defines an overall contact area width that is greater than a transverse wall width of the extensible member.

19. The ditch molding clip of claim 17, wherein the corrugated configuration is oriented to provide the upper surface with a sinusoidal shape.

20. The ditch molding clip of claim 11, wherein the single piece body comprises a molded polymeric body.

* * * * *

UNITED STATES PATENT AND TRADEMARK OFFICE
CERTIFICATE OF CORRECTION

| | |
|---|---|
| PATENT NO. | : 9,821,730 B1 |
| APPLICATION NO. | : 15/158784 |
| DATED | : November 21, 2017 |
| INVENTOR(S) | : Jason A. Meyers et al. |

Page 1 of 2

It is certified that error appears in the above-identified patent and that said Letters Patent is hereby corrected as shown below:

On the Title Page

Column 1, (22) Filed, Line 1, after "May 19, 2016", insert --¶(65) Prior Publication Data US 2017/0334369 A1 Nov. 23, 2017--

Column 2, (57) Abstract, Line 12, delete "clip-to-weld stud" and insert --clip-to-weld-stud-- therefor In the Claims Column 5, Line 33, in Claim 1, after "opening", insert --;--

Column 5, Line 44, in Claim 1, delete "clip-to-weld stud" and insert --clip-to-weld-stud-- therefor Column 5, Lines 53-54, in Claim 3, delete "clip-to-weld stud" and insert --clip-to-weld-stud-- therefor Column 5, Line 67, in Claim 6, delete "clip-to-weld stud" and insert --clip-to-weld-stud-- therefor Column 6, Line 19, in Claim 11, after "opening", insert --;--

Column 6, Line 31, in Claim 12, delete "molding" and insert --cover-- therefor

Column 6, Line 37, in Claim 12, delete "clip-to-weld stud" and insert --clip-to-weld-stud-- therefor Column 6, Line 40, in Claim 13, delete "molding" and insert --cover-- therefor Column 6, Line 44, in Claim 14, delete "molding" and insert --cover-- therefor Column 6, Line 48, in Claim 15, delete "molding" and insert --cover-- therefor Signed and Sealed this
Fifth Day of June, 2018

Andrei Iancu
*Director of the United States Patent and Trademark Office*

CERTIFICATE OF CORRECTION (continued)
U.S. Pat. No. 9,821,730 B1

Column 6, Line 50, in Claim 15, delete "clip-to-weld stud" and insert --clip-to-weld-stud-- therefor Column 6, Line 53, in Claim 16, delete "molding" and insert --cover-- therefor Column 6, Line 58, in Claim 17, delete "molding" and insert --cover-- therefor Column 6, Line 62, in Claim 18, delete "molding" and insert --cover-- therefor Column 6, Line 65, in Claim 19, delete "molding" and insert --cover-- therefor Column 7, Line 1, in Claim 20, delete "molding" and insert --cover-- therefor